Patented May 4, 1937

2,079,318

UNITED STATES PATENT OFFICE 2,079,318

ESTERS OF 2-PHENYL-QUINOLINE-4-CARBOXYLIC ACIDS

Hanns John, Prague, Czechoslovakia

No Drawing. Application November 3, 1934,
Serial No. 751,424. In Czechoslovakia November 10, 1933

1 Claim. (Cl. 260—39)

It has been found that by the esterification of 2-phenyl-quinoline-4-carboxylic acid, or its substitution products, isomers or homologues, with glycerol or by the action of halohydrins of glycerol upon the said acids or their salts, esters or acid halides, compounds may be obtained which heretofore have not been described and which may be employed therapeutically or may represent intermediate products for the production of other likewise practically useful substances. It has further been found that the compounds thus obtained may also be caused to react with the said acids. Provided that the products obtained contain halogen, they are preferably caused to react with the salts of these acids.

Example 1

5 parts by weight of 2-phenyl-quinoline-4-carboxylic acid, 70 parts by weight of glycerol and 16.6 parts by weight of sulphuric acid (sp. gr. 1.84) are heated for some hours on the water bath. The mixture is then rendered alkaline, the precipitate is washed and dried and the $\alpha$-monoglycerol ester produced is purified by converting it into the hydrochloride. From benzene, white needles crystallize out, which melt at 99° C., and are soluble in the usual alcohols and in ether and benzene.

On treating 2-phenyl-quinoline-4-carboxylic acid chloride with glycerol in equimolecular proportions or heating potassium 2-phenyl-quinoline-4-carboxylate with $\alpha$-monochlorhydrin also in equimolecular proportions, the 2-phenyl-quinoline-4-carboxylic acid glycerol ester is likewise formed.

The $\alpha$-mono-glycerol ester of 2-phenyl-6-methoxy-quinoline-4-carboxylic acid, obtained in a similar manner, melts at 167° C., the 2-(p)-tolyl-quinoline-4-carboxylic acid-glycerol ester melts at 110.5° C. and the 2-phenyl-quinoline-4'-carboxylic acid-glycerol ester obtained from the isomeric 2-phenyl-quinoline-4'-carboxylic acid crystallizes from benzene in colourless plates of a melting point of 113° C.

Example 2

30 parts by weight of potassium 2-phenyl-quinoline-4-carboxylate and 6.7 parts by weight of $\alpha$-dichlorhydrin are heated for 10 to 20 hours at 160° to 170° C. The product is then triturated with sodium carbonate, washed, extracted with ether and dried in a vacuum. For the purpose of further purification, the product is dissolved in olive oil and precipitated with petroleum ether. The $\alpha,\alpha'$-bis-(2-phenyl-quinoline-4-carboxylic acid)-glycerol ester is obtained as a white powder which is readily soluble in the usual alcohols and melts at 58° C.

Substances of empirically the same composition are obtained by the action of the 2-phenyl-quinoline-4-carboxylic acid-($\gamma$-chlor-propandiol)-$\alpha$-ester (mentioned in Example 4 given below) on the above-mentioned potassium salt or by heating 2 mols. of the acid chloride with 1 mol. of glycerol.

The $\alpha,\alpha'$-bis-(2-phenyl-6-methoxy-quinoline-4-carboxylic acid)-glycerol ester melts at 92° to 94° C., the $\alpha,\alpha'$-bis-(2-(p)-tolyl-quinoline-4-carboxylic acid)-glycerol ester melts at 73° to 75° C., and the $\alpha,\beta$-bis-(2-phenyl-quinoline-4-carboxylic acid)-glycerol ester (prepared by using $\beta$-dichlorhydrin and also by a two-stage process involving the preparation of the $\beta$-monoglycerol ester and esterifying the latter in the $\alpha$-position with an equimolecular amount of the acid chloride or by the sulphuric acid method) melts at 65° to 68° C.

Example 3

3.6 parts by weight of 2-phenyl-quinoline-4-carboxylic acid-$\beta$-$\beta'$-dichlor-isopropyl ester, mentioned in Example 4 given below, and 5.8 parts by weight of potassium 2-phenyl-quinoline-4-carboxylate are heated for 10 to 20 hours at 160° to 170° C. The product is then triturated with soda, washed, extracted with ether and dried in a vacuum. For the purpose of purification, it is re-crystallized from amyl alcohol and from benzene. The $\alpha,\beta,\gamma$-tri-(2-phenyl-quinoline-4-carboxylic acid)-glycerol ester thus obtained melts at 135° C.

Example 4

9.5 parts by weight of 2-phenyl-quinoline-4-carboxylic acid chloride and 3.5 parts by weight of $\alpha$-monochlorhydrin—dissolved in about 70 parts by weight of benzene—are heated on the water bath until the evolution of hydrochloric acid is completed. The solvent is then distilled off, and the residue is triturated with soda, washed and dissolved in ether, and after filtration the ether is removed. The 2-phenyl-quinoline-4-carboxylic acid-$\gamma$-chlor-propandiol-$\alpha$-ester is deposited from alcohol in the form of colourless needles of a melting point of 109° C.

The use of $\alpha$-dichlorhydrin leads to the 2-phenyl-quinoline-4-carboxylic acid-$\beta$-$\beta'$-dichlorisopropyl ester, which is deposited from alcohol in colourless monoclinic crystals, which melt at 98° C. The action of 1 mol. of $\alpha$-monochlorhydrin on 2 mols. of the acid chloride yields γ,β-bis-(2-phenyl-quinoline-4-carboxylic acid)-α-chlor-propandiol ester of a melting point of 135° C. The 2-(p)-tolyl-quinoline-4-carboxylic acid-β,β'-dichlor-isopropyl ester melts at 101° C.

The halohydrins of glycerol may be esterified with the phenyl-quinoline-carboxylic acids e. g. in this manner:

(a) Salts of the acids + halohydrins of glycerol, or (b) Halohydrins of glycerol + acid halide.

According to the used molecular quantities there are obtained phenyl-quinoline-carboxylic esters of glycerol containing or not containing halogen.

I claim:

The esters of 2-phenyl-quinoline-4-carboxylic acid of the general formula $$\begin{array}{c} CH_2Z \\ | \\ CHX \\ | \\ CH_2Y \end{array}$$

wherein X represents a member of the group consisting of OH and OR; Y represents a member of the group consisting of OH, OR and halogen; and Z represents a member of the group consisting of OR and halogen; wherein at least one of X, Y and Z is OR; and wherein R represents the radical of the said acid.

HANNS JOHN.